US009182484B2

(12) United States Patent
Schulte et al.

(10) Patent No.: US 9,182,484 B2
(45) Date of Patent: Nov. 10, 2015

(54) TRAFFIC INFORMATION SERVICES-BROADCAST (TIS-B) AUTOMATIC ADDRESS DETECTION AND COVERAGE INDICATION

(71) Applicant: Garmin International, Inc., Olathe, KS (US)

(72) Inventors: Christopher E. P. Schulte, Independence, OR (US); Timothy G. Hartley, Salem, OR (US)

(73) Assignee: Garmin International, Inc., Olathe, KS (US)

( * ) Notice: Subject to any disclaimer, the term of this patent is extended or adjusted under 35 U.S.C. 154(b) by 646 days.

(21) Appl. No.: 13/739,636

(22) Filed: Jan. 11, 2013

(65) Prior Publication Data
US 2014/0197980 A1 Jul. 17, 2014

(51) Int. Cl.
*G01S 13/76* (2006.01)
*G01S 13/78* (2006.01)
*G01S 13/93* (2006.01)
*G08G 5/00* (2006.01)
*G01S 13/91* (2006.01)
*G01S 13/82* (2006.01)

(52) U.S. Cl.
CPC .............. *G01S 13/91* (2013.01); *G01S 13/765* (2013.01); *G01S 13/781* (2013.01); *G01S 13/825* (2013.01); *G01S 13/93* (2013.01); *G01S 13/9303* (2013.01); *G08G 5/0013* (2013.01); *G08G 5/0021* (2013.01); *G08G 5/0078* (2013.01); *G08G 5/0004* (2013.01); *G08G 5/0008* (2013.01)

(58) Field of Classification Search
CPC ... G01S 13/765–13/784; G01S 13/91–13/931; G08G 5/00; G08G 5/0004–5/0026
USPC ..................... 342/29–51, 385, 386, 407, 408; 340/945, 961
See application file for complete search history.

(56) References Cited

U.S. PATENT DOCUMENTS

| 6,885,340 | B2 * | 4/2005 | Smith et al. | 342/465 |
|---|---|---|---|---|
| 7,043,355 | B2 * | 5/2006 | Lai | 701/120 |
| 7,495,612 | B2 * | 2/2009 | Smith | 342/450 |
| 7,612,716 | B2 * | 11/2009 | Smith et al. | 342/454 |
| 7,747,360 | B2 * | 6/2010 | Canu-Chiesa et al. | 701/3 |
| 7,755,532 | B2 * | 7/2010 | Dooley | 342/36 |
| 8,004,452 | B2 * | 8/2011 | Rolfe et al. | 342/37 |
| 8,063,816 | B2 * | 11/2011 | Troxel | 342/30 |
| 2002/0004697 | A1 * | 1/2002 | Lai | 701/120 |
| 2003/0137444 | A1 * | 7/2003 | Stone et al. | 342/30 |
| 2007/0252760 | A1 * | 11/2007 | Smith et al. | 342/451 |
| 2009/0322589 | A1 * | 12/2009 | Dooley | 342/37 |
| 2011/0125399 | A1 * | 5/2011 | Clark et al. | 701/208 |
| 2011/0148690 | A1 * | 6/2011 | Mosher | 342/30 |
| 2012/0038501 | A1 * | 2/2012 | Schulte et al. | 342/30 |
| 2013/0141268 | A1 * | 6/2013 | Getson et al. | 342/30 |
| 2014/0024395 | A1 * | 1/2014 | Johnson et al. | 455/456.3 |
| 2014/0197980 | A1 * | 7/2014 | Schulte et al. | 342/37 |
| 2014/0197981 | A1 * | 7/2014 | Hartley et al. | 342/37 |

OTHER PUBLICATIONS www.flyadsb.com, published prior to Jan. 11, 2013.
ADS-B Wikipedia entry, published prior to Jan. 11, 2013.
ForeFlight Stratus, published prior to Jan. 11, 2013.
U.S. Appl. No. 13/739,656, filed Jan. 11, 2013.

* cited by examiner

*Primary Examiner* — Peter Bythrow
(74) *Attorney, Agent, or Firm* — Samuel M. Korte; Mohammad M. Ali

(57) ABSTRACT

Techniques are described that allow a system, such as a portable ADS-B-enabled device, to automatically determine whether the aircraft in which the system is employed is included in air traffic information (e.g., TIS-B air traffic information) broadcast by an air traffic control (ATC) ground station. The system includes a receiver assembly to receive a first transmission from a transponder of the aircraft that includes an identification address (e.g., an ICAO address) that identifies the aircraft. The receiver assembly also receives a second transmission from the ATC ground station that includes air traffic information and a client list including identification addresses of aircraft included in the air traffic information. The identification address of the aircraft is retrieved from the first transmission and used to determine whether the aircraft is included in the air traffic information by comparing the identification address with the identification addresses in the client list.

20 Claims, 5 Drawing Sheets

TRAFFIC INFORMATION SERVICES-BROADCAST (TIS-B) AUTOMATIC ADDRESS DETECTION AND COVERAGE INDICATION

BACKGROUND

Automatic Dependent Surveillance-Broadcast (ADS-B) is a cooperative surveillance technique used for air traffic control and related applications. ADS-B-equipped aircraft determine their position using a Global Navigation Satellite System (GNSS) such as the United States Global Positioning System (GPS), or other position-determining equipment. The determined position of the aircraft is then combined with other data and broadcast from the aircraft using an ADS-B transceiver (e.g., a transponder). The transmitted data may include the determined position, the type of aircraft, the speed of the aircraft, the aircraft's flight number, and whether the aircraft is turning, climbing, or descending. Other ADS-B transceivers integrated into the air traffic control (ATC) system or installed aboard other aircraft receive and use the broadcast information, which is periodically updated, to provide users with an accurate depiction of real-time aviation traffic, both in the air and on the ground.

ADS-B is comprised of two different services: ADS-B Out and ADS-B In. ADS-B Out relates to the periodic broadcast of information about the aircraft, such as identification, current position, altitude, and velocity, through an onboard transmitter. ADS-B In relates to the receipt of transmitted data, such as Traffic Information Services-Broadcast (TIS-B) data, Flight Information Services-Broadcast (FIS-B) data and direct communication from nearby aircraft. Ground traffic systems process received ADS-B transmissions and other information to broadcast data related to aviation traffic. For example, ATC systems may broadcast TIS-B data, which includes aggregated ADS-B data received from aircraft transmitters, and additional information, such as FIS-B data, to enable broadcast recipients to have a comprehensive understanding of ground and air traffic. TIS-B broadcasts supplement ADS-B to provide additional situational awareness of all traffic known to the ATC system, including aircraft that are not transmitting ADS-B information. The ATC ground station transmits surveillance target information on the ADS-B data link for unequipped targets or targets transmitting only on another ADS-B link. (e.g., 978 MHz vs. 1030/1090 MHz)

SUMMARY

Techniques are described that allow an ADS-B system, such a portable ADS-B-enabled device, to determine whether the aircraft in which the system is employed is included in air traffic information (e.g., is included in TIS-B air traffic information) broadcast by an air traffic control (ATC) ground station. The system includes a receiver assembly configured to receive a transmission originating from a transponder on the same aircraft. In embodiments, the transmission may be a Mode S transmission and may include an identification address, such as an International Civil Aviation Organization (ICAO) address, that identifies the transmitting aircraft to ATC ground stations or other aircraft. The identification address of the aircraft is retrieved from the aircraft's transmission. In embodiments, a receiver assembly may then receive a second transmission broadcast from an ATC ground station that includes air traffic information (e.g., TIS-B air traffic information) and a client list (e.g., a TIS-B service status list) including identification addresses (e.g., the ICAO addresses) of aircraft included in the air traffic information. The identification address of the aircraft retrieved from the transmission from the aircraft transponder is used to determine whether the aircraft is included in the air traffic information by comparing the retrieved identification address with the identification addresses in the client list included in the transmission broadcast by the ATC ground station. In embodiments, the determination may include a search of the TIS-B service status list for the ICAO address of the aircraft.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
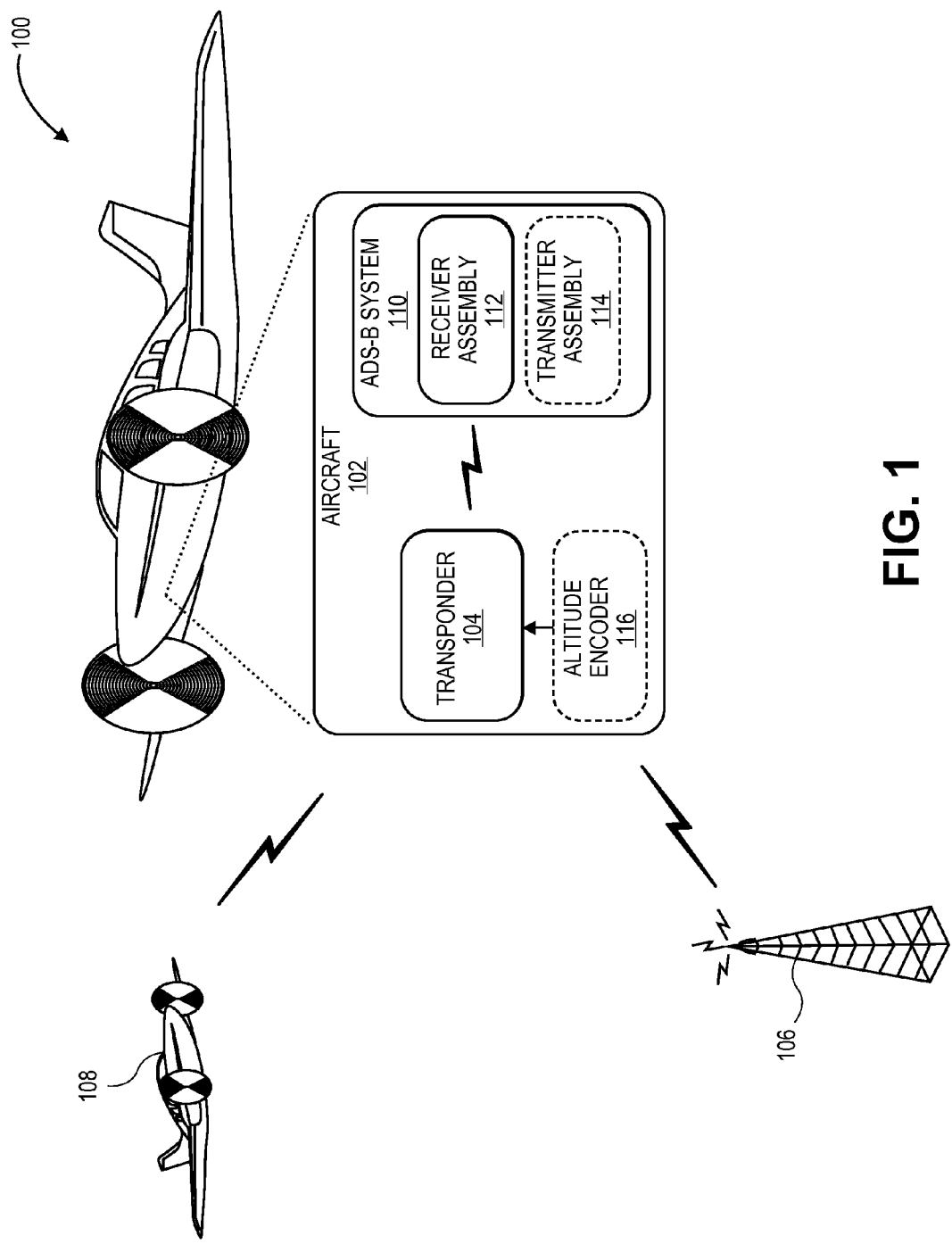
FIG. 1 is an illustration of an environment in an example embodiment that includes an aircraft that employs an ADS-B system having a receiver assembly that is configured to receive reply transmissions from a transponder of the aircraft.

Aircraft are assigned a unique aircraft identification address, such as a 24-bit ICAO address, upon registration of the aircraft. This identification address becomes a part of the aircraft's Certificate of Registration and provides a unique identifier that is associated with the aircraft. The ICAO address is programmed into the aircraft's Mode S transponder and used to identify the aircraft to ATC ground stations and/or other aircraft capable of receiving Mode S replies from the transponder. When a portable ADS-B-enabled device is employed in an aircraft, it is usually necessary for the pilot to manually program the ICAO address into the device to ensure the device is receiving TIS-B information for the his specific aircraft (Coverage Indicator). However, manual programming of the ICAO address by the pilot is cumbersome and can introduce error (e.g., misprogramming of the ICAO address), which would provide misleading information as to whether or not the TIS-B data is complete or accurate around his aircraft.

Accordingly, techniques are described that allow an ADS-B system, in particular, a portable ADS-B-enabled device, to automatically determine whether the aircraft in which the system is employed is included in air traffic information (e.g., TIS-B air traffic information) broadcast by an ATC ground station. In one or more embodiments, an ADS-B system (e.g., a portable ADS-B-enabled device) configured for operation in an aircraft includes a receiver assembly and a processing system. The receiver assembly is operable to receive a transmission from a transponder associated with the aircraft. The transponder's transmission includes an identification address configured to identify the aircraft. For example, in embodiments, the receiver assembly may comprise a 1090 MHz receiver operable to receive Mode S transmissions, which include an ICAO address, from a Mode S transponder associated with the aircraft. The processing system is operable, via execution of one or more software modules, to extract the aircraft's identification address (e.g., the ICAO address) from the transmission for use by the ADS-B system.

The ADS-B system (e.g., portable ADS-B-enabled device) may further distinguish transmissions originating from the transponder associated with the aircraft from transmissions originating from transponders of other aircraft. For example, in one embodiment, the ADS-B system may employ a global navigation satellite system (GNSS) receiver operable to determine the position of the aircraft. The processing system is operable to distinguish the transmission received from the transponder associated with the aircraft from transmissions received from transponders of other aircraft based on the determined position of the aircraft. In another embodiment, the processing system is operable to distinguish the transmission originating from the transponder associated with the aircraft from transmissions originating from transponders of other aircraft by comparing a power level of the transmission received from the transponder associated with the aircraft with power levels of transmissions received from the transponders of the other aircraft.

The receiver assembly is further operable to receive a second transmission from the ATC ground station that includes air traffic information and a client list including identification addresses of aircraft included in the transmitted air traffic information. For example, in embodiments, the receiver assembly may comprise a 1090 MHz receiver and/or a 978 MHz receiver configured to receive TIS-B transmissions broadcast from ATC ground stations. The TIS-B transmissions include TIS-B air traffic information and a TIS-B service status list including the ICAO addresses of aircraft included in the TIS-B air traffic information. The processing system is operable, via execution of one or more software modules, to determine whether the aircraft employing the ADS-B system is included in the air traffic information (e.g., to determine whether TIS-B air traffic coverage is provided to the aircraft) by comparing the identification address of the aircraft with the identification addresses in the client list. In embodiments, the system determines whether the aircraft employing the ADS-B system is included by comparing the ICAO address of the aircraft with the ICAO addresses within the TIS-B service status list. In embodiments, the TIS-B service status list identifies all aircraft included in the TIS-B air traffic coverage broadcast by an ATC ground station.

In the following discussion, an example aircraft environment in which an ADS-B system, such as a portable ASD-B-enabled device, may be employed in accordance with the present disclosure is first described. Example functionality is then described that may be implemented by the ADS-B system in the exemplary environment to automatically retrieve the identification address (e.g., the ICAO address) of the aircraft employing the ADS-B system from transmissions originating from a transponder of the aircraft (e.g., a Mode S transponder) and/or to determine whether the aircraft employing the ADS-B system is included in the air traffic information (e.g., TIS-B air traffic information) broadcast by an ATC ground station, in the exemplary environment as well as in other environments without departing from the spirit and scope thereof.

Example Environment

FIG. 1 illustrates an environment 100 in an example embodiment in which an ADS-B system is operable to automatically extract the data from the transponder of the aircraft (e.g., a Mode S transponder). This data contains the identification address (e.g., the ICAO address), aircraft altitude, Mode 3/A code, flight ID, aircraft position, capabilities and performance etc. The ADS-B system is further operable to determine whether the aircraft equipped with the ADS-B system is included in the air traffic information (e.g., TIS-B air traffic information) broadcast by an ATC ground station by comparing the identification address of the aircraft with the identification addresses in the client list.

The illustrated environment 100 comprises an aircraft 102 equipped with a transponder 104, which may be a transponder, such as a Mode S transponder, or the like. Upon receipt of a radio frequency interrogation from an interrogation source, such as an air traffic control (ATC) ground station 106, another aircraft 108, or the like, the transponder 104 is configured to transmit a reply transmission containing information about the aircraft 102, which includes an aircraft identification address for the aircraft 102. The information transmitted by the transponder 104 may be used by the interrogation source (e.g., by the ATC ground station 106 or another aircraft 108) to assist in identifying and tracking the aircraft 102.

In one embodiment, the transponder 104 may comprise a transponder of a Traffic Collision Avoidance System (TCAS). When interrogated by an ATC ground station 106 or the active traffic detection system (e.g., TAS/TCAD/TCAS) of another aircraft (e.g., aircraft 108), the transponder 104 may transmit a Mode S reply transmission. The Mode S reply transmission may include the ICAO address assigned to the aircraft 102, which is a unique identifier programmed into the transponder 104. The transponder 104 may further transmit Mode A and/or Mode C reply transmissions. These reply transmissions include a variety of information about the aircraft 102, including, but not limited to: an assigned Mode 3/A "squawk" code for the aircraft 102, the IDENT indication for the aircraft 102, the aircraft's altitude, and the like.

As shown in FIG. 1, an ADS-B system 110 is associated with the aircraft 102. In embodiments, the ADS-B system 110 may comprise a portable ADS-B-enabled device that may be carried by a flight crew member (e.g., the pilot, a copilot, etc.) into the aircraft cockpit. However, it is contemplated that, in some embodiments, the ADS-B system may comprise an avionic component installed within the aircraft 102.

In embodiments, the ADS-B system 110 may be configured to furnish ADS-B In service without corresponding ADS-B Out service. In such embodiments, the ADS-B system 110 may be capable of receiving TIS-B data as well as other ADS-B data, such as FIS-B data, and so forth, from an ATC ground station 106 and/or direct communication with other (nearby) aircraft 108. However, it is contemplated that, in other embodiments, the ADS-B system 110 may also be configured to furnish both ADS-B In and ADS-B Out service.

Thus, the ADS-B system 110 may periodically broadcast the position of the aircraft 102 determined from a position-determining system, such as a Global Navigation Satellite System (GNSS) receiver, or the like, over an ADS-B data link to ATC ground stations 106 and/or other aircraft 108. The ADS-B system 110 may further broadcast other relevant information about the aircraft 102 over the data link.

The ADS-B system 110 is configured to self-synchronize with the aircraft's transponder 104, extracting aircraft identification address (e.g., the ICAO address), as well as other information (e.g., pressure altitude, an indication that the aircraft is capable of receiving ADS-B In information (e.g., a 978 RX or 1090 RX capable bit), and so forth), from transmissions of the transponder 104 for use by the ADS-B system 110. As shown, the ADS-B system 110 may include a receiver assembly 112 that is configured to receive transmissions from the transponder 104 that are transmitted periodically or when the transponder 104 is interrogated. Information including the aircraft identification address (e.g., the ICAO address) is extracted from the received reply transmissions for use by the ADS-B system 110. In this manner, the ADS-B system 110 may remain physically independent of (e.g., physically separated from) the transponder 104 and other aircraft avionics. For example, as discussed, the ADS-B system 110 may comprise a portable ADS-B device or ADS-B enabled devices. Thus, information utilized by the ADS-B system 110 associated with the aircraft 102 may be acquired without the installation of ADS-B dedicated flight crew controls and/or a wired data interface to the transponder 104 or other avionics in the aircraft 102.

The ADS-B system 110 may employ passive reception of transponder reply transmissions. In such embodiments, the receiver assembly 112 is configured to receive reply transmissions of the transponder 104 that are transmitted in response to interrogation of the transponder 104 by an interrogation source external to the aircraft 102 (e.g., an ATC ground station 106, another aircraft 108, and so forth) or receive transmissions of the transponder 104 that are transmitted periodically.

The ADS-B system 110 may also employ active interrogation of the transponder to cause the transponder to broadcast reply transmissions. In such embodiments, the ADS-B system 110 may further include a transmitter assembly 114 configured to wirelessly communicate interrogations to the transponder 104 to cause the transponder 104 to transmit a reply transmission that may be received by the receiver assembly 112. The receiver assembly 112 is configured to receive the reply transmissions provided by the transponder 104 in reply to the interrogations sent by the transmitter assembly 114.

In embodiments employing a transmitter assembly 114 for active wireless interrogation of the transponder 104, it is contemplated that the ADS-B system 110 may continue to employ passive reception. Thus, the receiver assembly 112 may receive reply transmissions from the transponder 104 that are transmitted periodically or in response to interrogations from external interrogation sources. For example, under many circumstances, the transponder 104 may be interrogated by external interrogation sources (e.g., an ATC ground station 106, another aircraft 108, and so forth) during normal operation of the aircraft 102 to an extent that renders active interrogation of the transponder 104 by the transmitter assembly 114 unnecessary. Consequently, active interrogation of the transponder 104 may be employed when external interrogation of the transponder 104 causes insufficient reply transmissions to be transmitted. However, it is also contemplated that in embodiments where active interrogation is employed, reply transmissions from the transponder 104 that are transmitted in response to interrogations from external interrogation sources may be disregarded in favor of reply transmissions that are received in response to active interrogation of the transponder 104 by the transmitter assembly 114.

The receiver assembly 112 is further operable to receive transmissions broadcast from the ATC ground station 106 that include air traffic information and a client list including identification addresses of aircraft included in the air traffic information. For example, in embodiments, the receiver assembly may comprise a 1090 MHz receiver and/or a 978 MHz receiver configured to receive TIS-B transmissions from ATC ground stations 106. The TIS-B transmissions include TIS-B air traffic information and a TIS-B service status list including the ICAO addresses of aircraft (e.g., aircraft 102, 108) included in the TIS-B air traffic information. The identification address (e.g., the ICAO address) of the aircraft 102 retrieved from the transmission is used to determine whether the aircraft 102 is included in the air traffic information (e.g., the TIS-B air traffic coverage) by comparing the identification address (e.g., the ICAO address) of the aircraft 102 with the identification addresses (e.g., the ICAO addresses) included in the client list (e.g., TIS-B service status list).

Figure 2A:
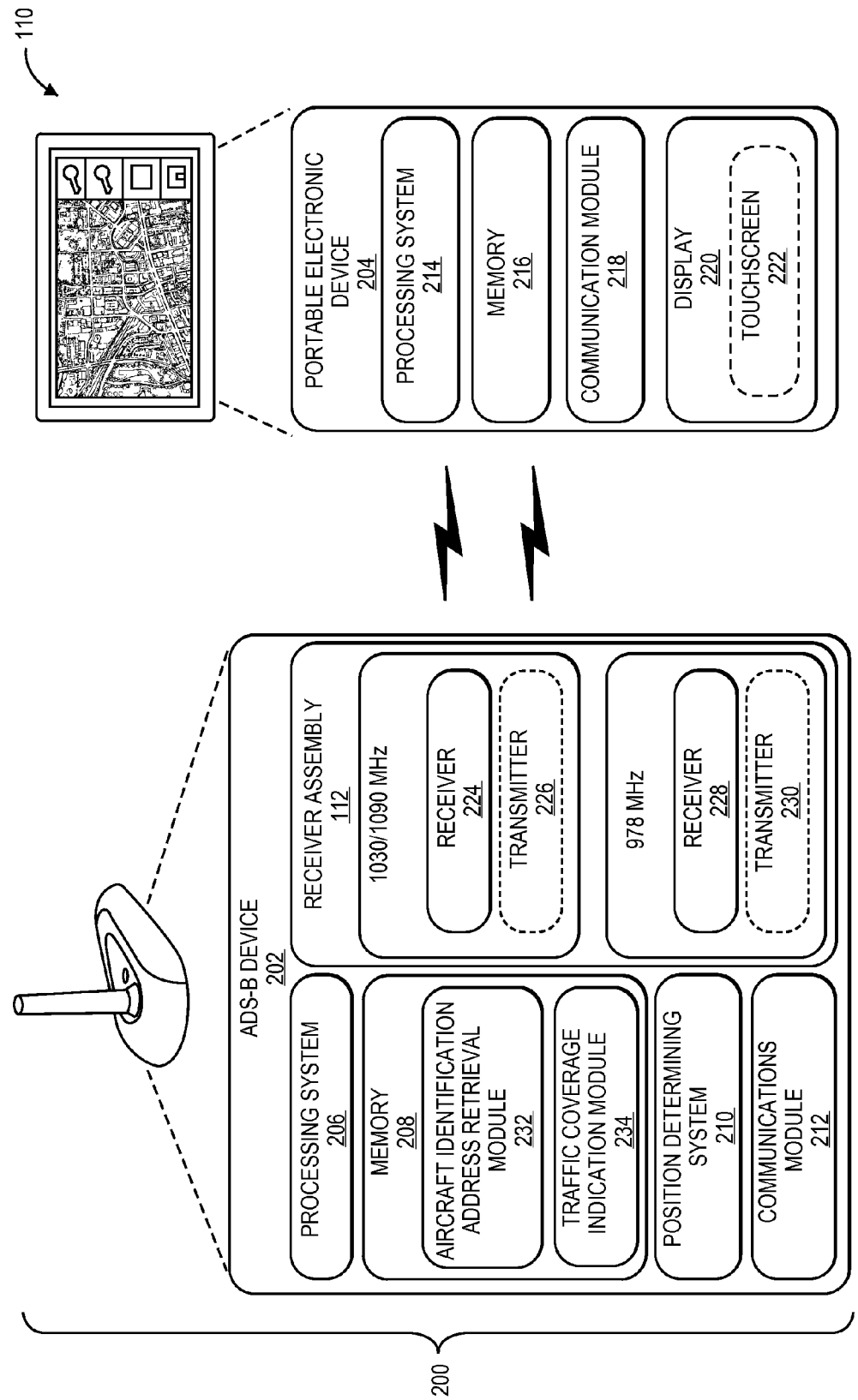
FIG. 2A is an illustration further depicting the ADS-B system shown in the example environment of FIG. 1, wherein the ADS-B system is shown as being implemented as one or more portable ADS-B-enabled devices, wherein at least one of the devices includes a receiver assembly configured to receive reply transmissions from the aircraft transponder and ATC ground stations.
Figure 2B:
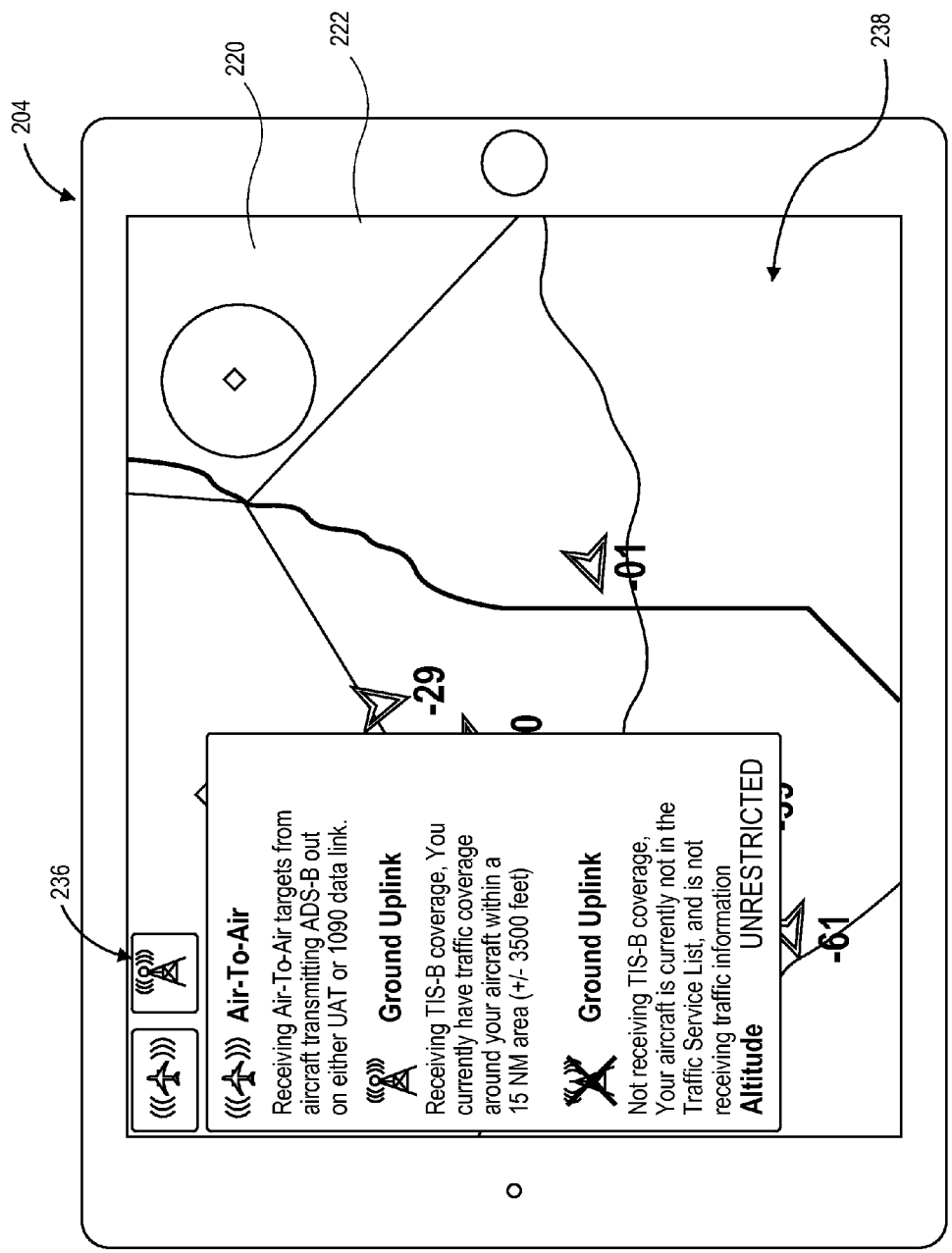
FIG. 2B is an illustration depicting the portable electronic device of the ADS-B system shown in FIG. 2A.

FIGS. 2A and 2B further illustrate the ADS-B system 110 shown in the example environment 100 of FIG. 1. In embodiments, the ADS-B system 110 may be implemented as one or more portable ADS-B-enabled electronic devices 200. For example, in FIG. 2A, the ADS-B system 110 illustrated comprises an ADS-B receiver 202 that is in communication with a portable (e.g., hand-held) electronic device 204, such as an aviation portable device, a tablet computer, a smartphone, and so forth, via a communication interface, which may be wired or wireless. The portable electronic device 204 may implement one or more software applications or modules (e.g., one or more apps) configured to furnish aircraft related information (e.g., ADS-B information, weather information, navigation/flight plan information, aircraft performance information, and so forth) to the flight crew (e.g., the pilot, a copilot, etc.) of the aircraft 102. In some configurations, the portable electronic device 204 may be integrated with the ADS-B-enabled electronic device 200 or portions thereof.

In such embodiments, the ADS-B receiver 202 may be portable so that the ADS-B receiver 202 and the portable electronic device 204 can be carried by a member of the flight crew (e.g., a pilot or copilot) into the cockpit of the aircraft 102 (FIG. 1) for use during operation of the aircraft 102. However, it is contemplated that, in other embodiments, the ADS-B system 110 may comprise an avionic component installed within the aircraft. For example, the ADS-B system 110 may comprise a multi-mode Universal Access Transceiver (UAT) system that is configured to self-synchronize its data with the aircraft's transponder 104 via system interrogations of the transponder 104. In embodiments, the ADS-B system 110 may comprise a UAT that may make use of multi-mode/multi-channel radio transceivers. However, in other embodiments, the ADS-B system 110 may employ two or more data link systems each equipped with separate receivers that form ADS-B system 110.

In FIG. 2A, the ADS-B receiver 202 illustrated includes a processing system 206, a memory 208, a position determining system 210, a communication module 212, and the receiver assembly 112. Similarly, the portable electronic device 204 illustrated includes a processing system 214, a memory 216, a communication module 218, and a display 220, which may include a touchscreen 222. However, it should be noted that the ADS-B receiver 202 and the portable electronic device 204 are not limited to the specific embodiments illustrated. Thus, the ADS-B receiver 202 and/or the portable electronic device 204 may include additional components or fewer components depending on the design requirement of the specific ADS-B system implementation. For example, in some configurations, the electronic device 204 may be integrated with the ADS-B receiver 202 or portions thereof.

The processing systems 206, 214 of the ADS-B receiver 202 and/or the portable electronic device 204 provide processing functionality for the ADS-B receiver 202 or the portable electronic device 204, respectively, and may include any number of processors, micro-controllers, or other processing systems, and resident or external memory for storing data and other information received or generated by the ADS-B receiver 202 and/or the portable electronic device 204. The processing systems 206, 214 may execute one or more software programs or code segments which implement techniques described herein. The processing systems 206/214 are not limited by the materials from which it is formed or the processing mechanisms employed therein, and as such, may be implemented via semiconductor(s) and/or transistors (e.g., electronic integrated circuits (ICs), programmable logic devices (PLDs), application-specific integrated circuits (ASICs)), and so forth.

The memory 208 of the ADS-B receiver 202 and/or the memory 216 of the portable electronic device 204 are examples of tangible device-readable media that provide storage functionality to store various data associated with the operation of the ADS-B system 110, such as the software programs and code segments mentioned above, or other data to instruct the processing systems 206, 214 and other elements of the ADS-B system 110 to perform the steps described herein. Although the ADS-B receiver and the portable electronic device are each shown as including a single memory 208, 216, a wide variety of types and combinations of memory may be employed. The memories 208, 216 may be integral with the respective processing systems 206, 216, stand-alone memory, or a combination of both. The memory 208, 216 may include, for example, removable and non-removable memory elements such as Random Access Memory (RAM), Read Only Memory (ROM), Flash memory, magnetic memory, optical memory, and so forth.

The position determining system 210 is configured to provide position-determining functionality for the ADS-B system 110. Position-determining functionality, for purposes of the following discussion, may relate to a variety of different navigation techniques and other techniques that may be supported by "knowing" one or more positions of the aircraft 102 (FIG. 1). For example, position-determining functionality may be employed to provide location data, velocity data, acceleration data, rate of climb/descent data, heading data, and a variety of other navigation-related data for the aircraft 102 to the processing system 206 of the ADS-B receiver 202 and/or the processing system 214 of the portable electronic device 204 for use by the ADS-B receiver 202 and/or the portable electronic device 204.

In embodiments, the position-determining system 210 may comprise a receiver that is configured to receive signals from one or more position-transmitting sources. For example, the position-determining system 210 may be configured for use with a Global Navigation Satellite System (GNSS). In embodiments, the position-determining system 210 may be a Global Positioning System (GPS) receiver operable to receive navigational signals from GPS satellites and to calculate a location of the aircraft 102 (FIG. 1) as a function of the signals. Other exemplary position-determining systems include, but are not limited to, a Global Orbiting Navigation Satellite System (GLONASS), a Galileo navigation system, and/or other satellite or terrestrial navigation systems.

As illustrated in FIG. 2A, the position-determining system 210 may be integral with the ADS-B receiver 202. However, it is contemplated that portable electronic device 204 may also include a position determining system in addition to, or in place of, the position determining system 210 shown. Moreover, in other embodiments, the position-determining system 210 may be configured as one or more separate components that communicate position information with the ADS-B system 110 (e.g., with the ADS-B receiver 202 and/or the portable electronic device 204) via a wired or wireless interface. A variety of configurations are possible.

The ADS-B receiver 202 and portable electronic device 204 are further illustrated as including communication modules 212, 218, respectively. The communication modules 212, 218 are representative of communication functionality to permit sending and/or receiving of data between the ADS-B receiver 202 and the portable electronic device 204, with other devices or systems within the aircraft 102, and so forth. The communication modules 212, 218 may be representative of a variety of communication components and functionality including, but not limited to: one or more wires/cables, one or more antennas; a browser; a transmitter and/or receiver; a wireless radio; data ports; software interfaces and drivers; data processing components; and so forth. Communication between the communication modules 212, 218 may be by a wired or wireless interface. Examples of wired interfaces include, but are not limited to: universal serial bus (USB), Ethernet, serial connections, and so forth. Examples of wireless interfaces include, but are not limited to: networks configured for communications according to one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on.

The ADS-B system 110 may include, or be coupled with, one or more displays to display information to members of the flight crew of the aircraft 102 (FIG. 1). For example, as shown in FIGS. 2A and 2B, the portable electronic device 204 is illustrated as including a display 220. In embodiments, the display 220 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface, air traffic information, information about other aircraft 108, and so forth. The display 220 may be backlit via a backlight such that it may be viewed in the dark or other low-light environments.

The display 220 may further be provided with a touch screen 222 for entry of data and commands. For example, a user may operate the ADS-B system 110 by touching the touch screen 222 and/or by performing gestures on the screen 222. In some embodiments, the touch screen 222 may be a capacitive touch screen, a resistive touch screen, an infrared touch screen, combinations thereof, and the like. Either or both of the ADS-B receiver 202 and the portable electronic device 204 may further comprise one or more input/output (I/O) devices (e.g., a keypad, buttons, a wireless input device, a thumbwheel input device, a trackstick input device, and so on) in addition to, or in place of, the touch screen 222. The I/O devices may include one or more audio I/O devices, such as a microphone, speakers, and so on.

As noted, the receiver assembly 112 provides functionality to receive reply transmissions from the transponder 104 of the aircraft 102 (FIG. 1) that are transmitted periodically or in response to interrogation of the transponder 104 by an interrogation source. In one or more embodiments, the transponder 104 may comprise a Mode S transponder. In such embodiments, the transponder 104 may be configured to detect interrogations transmitted at a frequency of 1030 MHz by ground stations or other active traffic detection equipped aircraft (e.g., the ATC ground station 106 or aircraft 108 of FIG. 1). When an interrogation is detected, the transponder 104 transmits a 1090 MHz Mode S reply transmission. The transponder 104 may further transmit a Mode A or Mode C reply transmission. Accordingly, in such embodiments, the receiver assembly 112 may comprise a 1090 MHz receiver (e.g., receiver 224) configured to receive the 1090 MHz Mode S reply transmissions (and Mode A/C reply transmissions) transmitted by the transponder 104.

In embodiments where a 1030 MHz transmitter 212 and active interrogation are employed, reply transmissions from the transponder 104 that are transmitted in response to interrogations from external interrogation sources (e.g., ATC ground stations 106, other aircraft 108, and so forth (FIG. 1)) may be received by the 1090 MHz receiver 224 in addition to reply transmissions from the transponder 104 that are transmitted in response to interrogation by the 1030 MHz transmitter 226. However, it is contemplated that in some embodiments, these reply transmissions may be disregarded (e.g., in favor of reply transmissions that are received in response to active interrogation of the transponder 104 by the 1030 MHz transmitter 226).

The receiver assembly 112 further provides functionality to receive periodic broadcasts containing ADS-B information from other aircraft 108 and ATC ground stations 106 over an ADS-B data link. In FIG. 2A, the receiver assembly 112 is illustrated as including one or more receivers (e.g., two receivers 224 and 228 are shown). The receiver assembly 112 may employ any of several different data link technologies including, but not limited to: Mode-S Extended Squitter (1090 ES), Universal Access Transceiver (978 MHz UAT), and VHF data link (VDL Mode 4). For example, in the illustrated embodiment, a first receiver (e.g., receiver 224) of the receiver assembly 112 may comprise a 1090 MHz receiver capable of receiving transmissions from the transponder 104 of the aircraft 102 (FIG. 1), which may be a 1090 ES transponder, while a second receiver (e.g., receiver 228) of the receiver assembly 112 may comprise a 978 MHZ receiver capable of receiving TIS-B transmissions from an ATC ground station 106 (FIG. 1). Thus, the ADS-B system 110 may be configured to furnish ADS-B In service without corresponding ADS-B Out service. In such embodiments, the ADS-B system 110 may be capable of receiving TIS-B data as well as other ADS-B data such FIS-B data, and so forth, from an ATC ground station 106, and/or direct communication from nearby aircraft 108.

In other embodiments, the receiver assembly 112 may be configured as a transceiver assembly and may further provide functionality to periodically broadcast information about the aircraft 102 over the ADS-B data link. In such embodiments, the receiver assembly 112 may include one or more transmitters 226, 230 (e.g., the receiver assembly 112 may comprise a transceiver assembly having one or more transceivers each comprised of one or more receivers and one or more transceivers). Thus, in the illustrated embodiment, the receiver assembly 112, configured as transceiver assembly, may include a full duplex 1030/1090 MHz transceiver and/or a 978 MHz transceiver. In such embodiments, the 1030/1090 MHz transceiver furnishes full duplex capability to communicate with the aircraft's transponder 104 via a 1030 MHz transmitter 226 for interrogations and a 1090 MHz receiver for reception of transponder replies. The 978 MHz transceiver assembly may be a UAT transceiver that includes a 978 MHz transmitter 230 and 978 MHz receiver 228. In this manner, the ADS-B system 110 may be configured to furnish both ADS-B In and ADS-B Out service. Thus, the ADS-B system 110 may periodically broadcast the position of the aircraft 102 determined from a position-determining system such as a Global Navigation Satellite System (GNSS) receiver, or the like, over an ADS-B data link to ATC ground stations 106 and/or other aircraft 108. The ADS-B system 110 may further broadcast other relevant information about the aircraft 102 over the data link.

In FIG. 2A, the ADS-B system 110 is illustrated as including an aircraft identification address retrieval module 232 that is representative of functionality to determine whether the aircraft 102, with which the ADS-B system 110 is associated, is within coverage of air traffic information (e.g., TIS-B air traffic information) broadcast by an ATC ground station 106 (FIG. 1). In the embodiment shown, the aircraft identification address retrieval module 232 is implemented as a software application stored in memory 208 and executed by the processing system 206 of the ADS-B receiver 202. However, it is contemplated that in other embodiments the aircraft identification address retrieval module 232 can be implemented as a software application stored in memory 216 and executed by the processing system 214 of the portable electronic device 204, or as multiple software application modules distributed between memories 208, 216 and executed by processing systems 206, 214 of both the ADS-B receiver 202 and the portable electronic device 204.

The aircraft identification address retrieval module 232 is representative of functionality to extract the identification address (e.g., the ICAO address) of the aircraft 102 from transmissions of a transponder of the aircraft 102 (e.g., Mode S transmission from a Mode S transponder) for use by the ADS-B system 110 (portable ADS-B-enabled devices 200). For example, the aircraft identification address retrieval module 232 may include functionality to distinguish the reply transmissions by the aircraft's (ownship 102) transponder 104 from reply transmissions received from other aircraft 108 in the vicinity, which may also be responding (e.g., local traffic).

In embodiments, the aircraft identification address retrieval module 232 may include functionality to compare the positions of transponders broadcasting Mode S replies received by the receiver assembly 112, with a position of the aircraft 102 (e.g., of the ADS-B system 110 employed within the aircraft 102) determined by the position determining system (e.g., global navigation satellite system (GNSS) receiver) 210. In this manner, the aircraft's (ownship 102) transponder 104 may be distinguished from transponders of other aircraft 108 as the transponder for which the position broadcast in the transponder's Mode S transmission most closely matches the position determined by the position determining system 210. For instance, the Mode S replies received from transponder 104 of aircraft 102 may be identified based on Mode S replies with positions determined to have identical or approximately identical to the position of aircraft 102 determined by the position determining system 210.

In other embodiments, the aircraft identification address retrieval module 232 may include functionality to measure and/or determine the power levels of received reply transmissions. In embodiments, a determination can be made, based on the power level of an individual received reply transmission, whether the reply transmission originated from the aircraft's (ownship 102) transponder 104 or from the transponder of other aircraft 108 in proximity to the aircraft 102. For example, the aircraft identification address retrieval module 232 may include functionality to determine when the power level of a received reply transmission exceeds a threshold power level, and is thus determined to be a reply transmission of the transponder 104, or is below a threshold power level, and is thus determined to be a reply transmission transmitted from another aircraft 108. Similarly, the aircraft identification address retrieval module 232 can cause a signature of the power level of the transponder 104 of the aircraft 102 to be stored in memory 208 to further prevent accidental use of data from transponder replies of adjacent traffic (e.g., aircraft 108 of FIG. 1).

In FIG. 2A, the ADS-B receiver 202 is further illustrated as including an air traffic coverage indication module 234 that is representative of functionality to determine whether the aircraft 102 is included in air traffic information (e.g., TIS-B air traffic information) broadcast by an ATC ground station 106. In the embodiment shown, the air traffic coverage indication module 234 is implemented as a software application stored in memory 208 and executed by the processing system 206 of the ADS-B receiver 202. However, it is contemplated that in other embodiments the air traffic coverage indication module 234 can be implemented as a software application stored in memory 216 and executed by the processing system 214 of the portable electronic device 204, or as multiple software application modules distributed between memories 208, 216 and executed by processing systems 206, 214 of both the ADS-B receiver 202 and the portable electronic device 204.

As noted, the receiver assembly 112 is operable to receive transmissions from the ATC ground station 106 (FIG. 1) that include air traffic information and a client list including identification addresses of aircraft included in the air traffic information. The air traffic coverage indication module 234 includes functionality to cause the processing system 206 to determine whether the aircraft 102 is included in the received air traffic information by comparing the identification address of the aircraft 102 with the identification addresses in the client list. For example, in embodiments, the receiver assembly 112 may be operable to receive transmissions from the ATC ground station 106 (FIG. 1) that include TIS-B air traffic information and a TIS-B service status list that includes ICAO addresses of aircraft included in the air traffic information. The air traffic coverage indication module 234 may thus include functionality to cause the processing system 206 to determine whether TIS-B air traffic coverage is provided to the aircraft 102 by comparing the ICAO address of the aircraft 102 with the ICAO addresses within the TIS-B service status list. In embodiments, the processing system 206 may perform a search of the received TIS-B service status list for the ICAO address of the aircraft 102 employing the ADS-B system 110.

The air traffic coverage indication module 234 further includes functionality to cause the ADS-B system 110 to furnish notifications to the flight crew (e.g., the pilot, a copilot, etc.) of the aircraft 102 related to whether the aircraft 102 is, or is not, included in the received air traffic information (e.g., that TIS-B air traffic coverage is not provided for the aircraft 102). Thus, when the air traffic coverage indication module 234 determines that the aircraft identification address of aircraft 102 (e.g., the ICAO address) is not included in the received client list (e.g., in the TIS-B service status list), the air traffic coverage indication module 234 may cause the ADS-B system 110 to furnish a notification that the aircraft 102 is not included in the air traffic information (e.g., that TIS-B air traffic coverage is not provided for the aircraft 102). Similarly, when the air traffic coverage indication module 234 determines that the aircraft identification address of aircraft 102 (e.g., the ICAO address) is included in the received client list (e.g., in the TIS-B service status list), the air traffic coverage indication module 234 may cause the ADS-B system 110 to furnish a notification that the aircraft 102 is included in the air traffic information (e.g., that TIS-B air traffic coverage is provided for the aircraft 102). In some configurations, the processing system 206 of the ADS-B receiver 202 and the processing system 214 of the portable electronic device 214 may be shared, integrated, or overlapping, such that the processing system 214 determines if the aircraft identification address of aircraft 102 is within the client list. That is, in some configurations, the aircraft identification address and the client list may be provided to the portable electronic device 214 such that the air traffic coverage indication module is at least partially executed by the portable electronic device 204.

In embodiments, the air traffic coverage indication module 234 may employ a deterministic status bit that is set when TIS-B coverage including the aircraft 102 is determined to be available. In this manner, the air traffic coverage indication module 234 may cause the ADS-B system 110 to furnish an indication to the flight crew that TIS-B coverage is available and/or that TIS-B coverage is not available. The air traffic coverage indication module 234 may include functionality to cause the status bit to be transmitted to the portable electronic device 204 via communication modules 212, 218, to cause an indication of whether coverage is, or is not, available to be furnished by the display 220. For example, as shown in FIG. 2B, the indication whether TIS-B coverage is, or is not, available may be furnished via indication 236, such as an icon, text, text boxes, graphical displays, and so forth, displayed by the display 220 of the portable electronic device 204. In embodiments, these indications 236 may be displayed in combination with the received air traffic information 238. However, it is contemplated that the indication whether TIS-B coverage is, or is not, available may be furnished in a variety of ways, such as by a light (e.g., a light emitting diode (LED) provided in the housing of the ADS-B receiver 202, and so forth).

In embodiments, the ADS-B system 110 may receive altitude information (e.g., pressure altitude) broadcast by the transponder 104 of aircraft 102. In FIG. 1, the altitude information is illustrated as being provided to the transponder 104 by an altitude encoder 116. However, it is contemplated that altitude information can also be furnished by other compatible sources such as an encoding altimeter, an air data computer, and so forth. The ADS-B system 110 may receive other information included in the Mode A, Mode C, or Mode S reply transmissions, such as an indication that the aircraft is capable of receiving ADS-B In information (e.g., a 978 RX or 1090 RX capable bit), and so forth. This information may be stored to memory 208 for use by the ADS-B system 110.

Utilizing the altitude broadcast by the transponder 104, the ADS-B system 110 (ADS-B device 202 and/or the portable electronic device 204) can provide accurate altitude information when the ADS-B system 110 is positioned within a pressurized cabin of the aircraft 102. Thus, in addition to the functionality described above, the ADS-B device 202 may transmit accurate altitude information to the portable device 204, for use and/or display, in situations where an integrated altimeter, positioned within the ADS-B device 202 (and/or the portable electronic device 204), can only provide cabin pressure.

In addition to the altitude information, or as an alternative, any information extracted from the transponder 104 by the ADS-B system 110 (ADS-B device 202) may be transmitted to the portable device 204 for use and/or display to the user. For example, the RX capable bits may be transmitted from the ADS-B device 202 to the portable device 204 to provide an annunciation on the display 220 of the portable device 204. Thus, the aircraft's data link RX capabilities may be displayed in combination, or in place of, the indication 236.

Generally, functions described herein can be implemented using software, firmware, hardware (e.g., fixed logic circuitry), manual processing, or a combination of these embodiments. The term "functionality" as used herein generally represents software, firmware, hardware, or a combination thereof. In the case of a software embodiment, for example, functionality may refer to executable instructions that perform specified tasks when executed on a processor, such as a processor of processing system 206 of the ADS-B system 110 (portable ADS-B-enabled device 200) of FIG. 2. The program code can be stored in one or more device readable media, an example of which is the memory 208 of the ADS-B system 110 (portable ADS-B-enabled device 200) of FIG. 2.

In some embodiments, the ADS-B system 110 may receive reply transmissions from the transponder 104 of the aircraft 102 that are transmitted periodically or when the transponder 104 is interrogated and use the reply transmissions in a manner unrelated to determining whether the aircraft 102 is included in air traffic information received from an ATC ground station 106. The ADS-B system 110 may retrieve information other than the aircraft identification address from the reply transmissions received by the receiver assembly 112 of aircraft 102 for use by processing system 206, 214. For instance, the ADS-B system 110 employed in the aircraft 102 may retrieve the current position, altitude, velocity, Mode 3/A "squawk" code or the IDENT indication for the aircraft 102. The information retrieved by ADS-B system 110 may be used to verify the accuracy and/or quality of transmitted data, analyze and remedy (i.e., troubleshoot) malfunctions in the ADS-B system, or configure systems of the aircraft 102. In embodiments, the retrieved information may be used to automatically execute an automated function or process or to notify the pilot and crew to take action (e.g., display a warning on a display of ADS-B system 110 notifying the user to take remedial steps to address a hardware malfunction).

In embodiments, the ADS-B system 110 may retrieve data transmitted by the transponder 104 of the aircraft 102 that identifies capabilities of the ADS-B system 110. For instance, the transponder 104 may transmit information that includes at least one bit reserved to indicate that the ADS-B system 110 employed in the aircraft 102 is presently capable to receive signals at a particular frequency (e.g., 978 MHz, 1030 MHz, 1090 MHz, etc.). If the receive capability bit is cleared (i.e., set as 0), instead of enabled (i.e., set as 1), this compatibility information may enable a user of the ADS-B system 110 to identify this feature as the root cause of a problem they are experiencing with the ADS-B system 110 (e.g., the air traffic monitoring feature of the ADS-B system 110 is non-operational).

Example Procedures

Figure 3A:
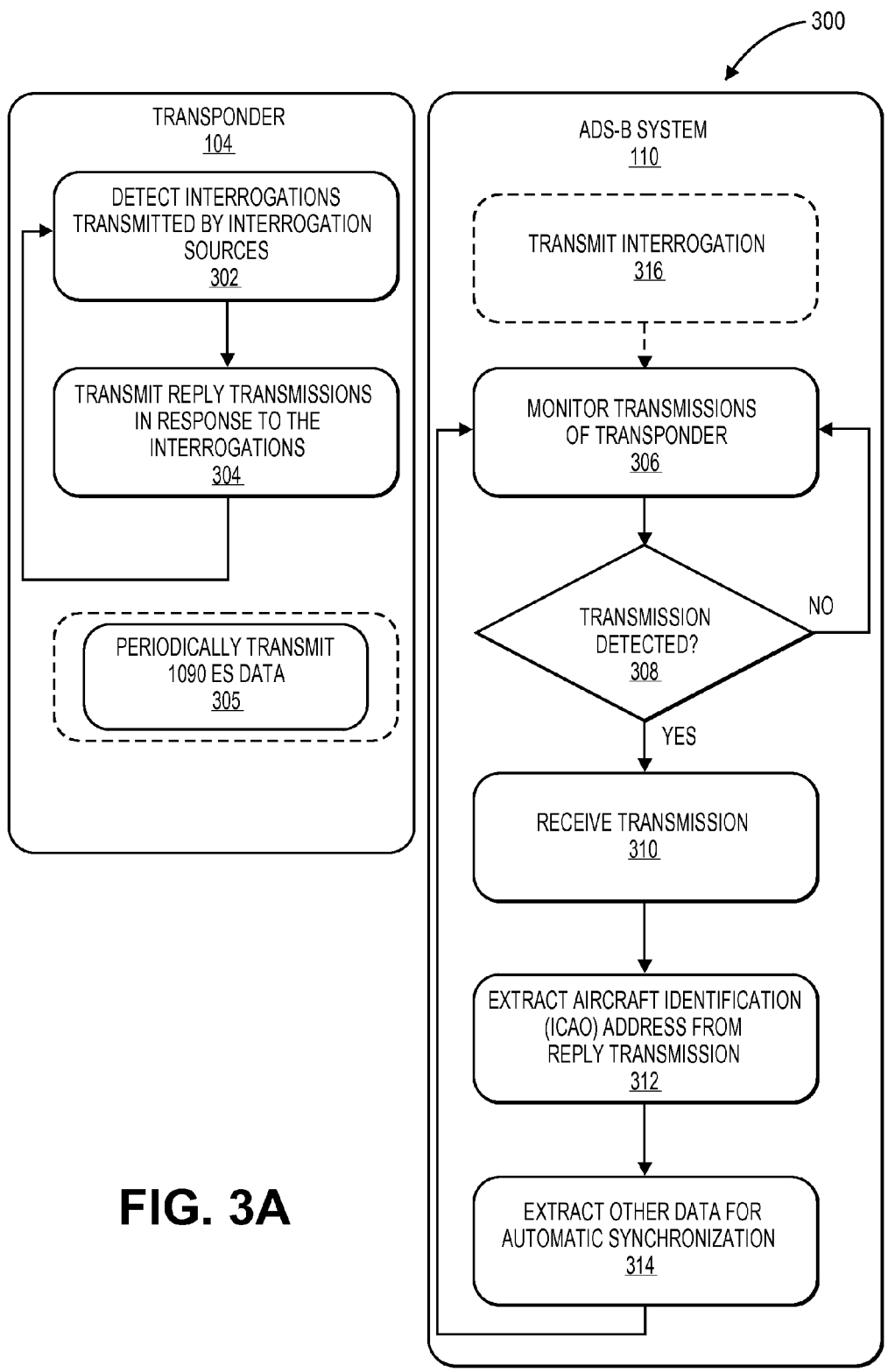
FIG. 3A is a flow diagram depicting a procedure in an example embodiment in which an aircraft identification address (e.g., an ICAO address) of an aircraft is acquired by an ADS-B system equipped with a receiver configured to receive transmissions from a transponder of the aircraft.
Figure 3B:
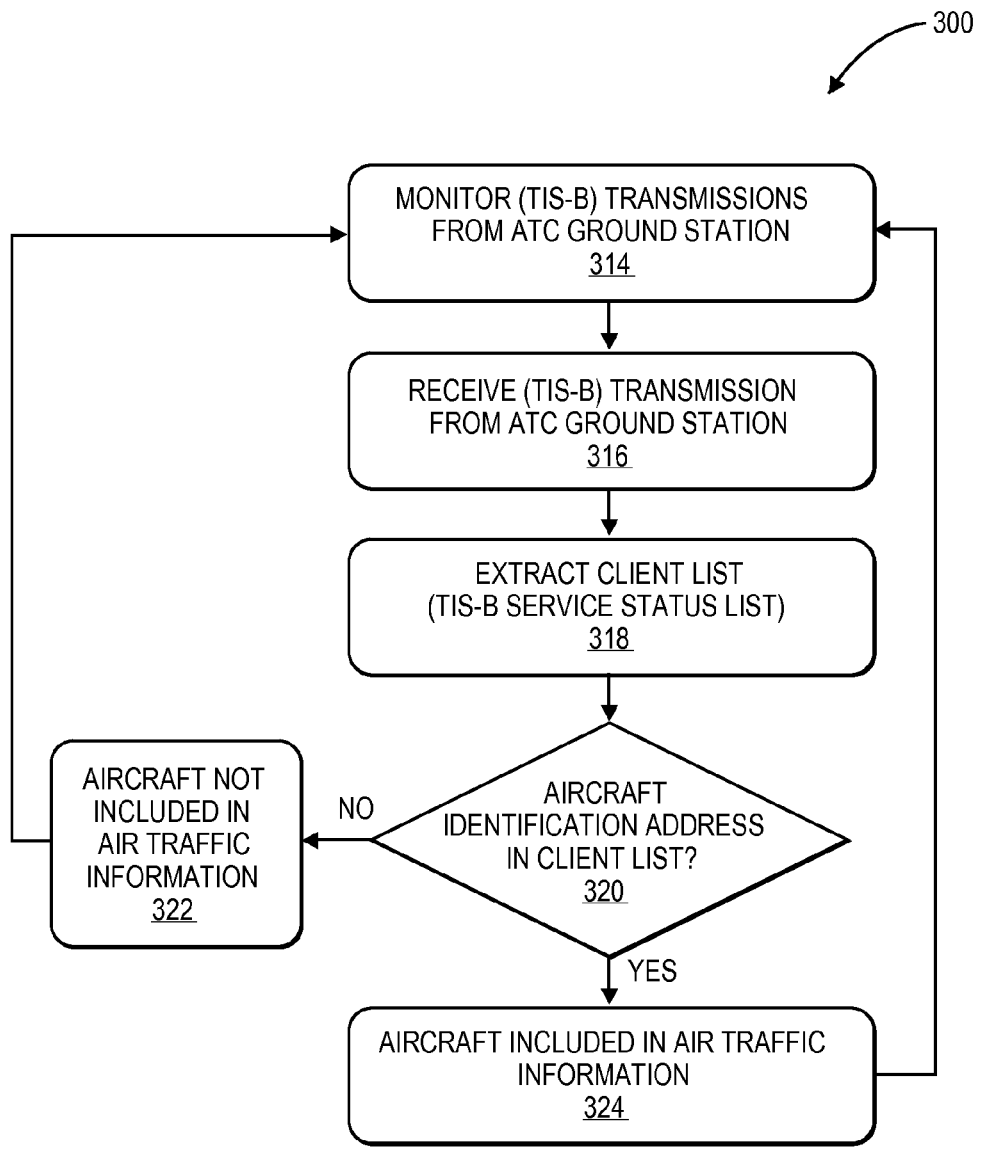
FIG. 3B is a flow diagram depicting a procedure in an example embodiment in which an aircraft identification address (e.g., the ICAO address) of an aircraft, which may be acquired in accordance with the procedure of FIG. 3A, is used to determine whether the aircraft is included in the air traffic information (e.g., TIS-B air traffic information) broadcast by an ATC ground station.

FIGS. 3A and 3B illustrate procedures 300 (e.g., methods or processes) in example embodiments that may be implemented by an ADS-B system to extract the identification address of the aircraft from transmissions of a transponder of the aircraft and/or to determine whether the aircraft is included in the air traffic information broadcast by an ATC ground station. Aspects of procedures 300 may be implemented in hardware, firmware, or software, or a combination thereof. The procedures 300 are shown as a set of blocks that specify operations performed by one or more devices and are not necessarily limited to the orders shown for performing the operations by the respective blocks. In portions of the following discussion, reference will be made to the environment 100 of FIG. 1, or the ADS-B system 110 (the portable ADS-B-enabled devices 200) of FIGS. 2A and 2B.

FIG. 3A depicts a procedure 300 in an example embodiment in which an ADS-B system 110 extracts the identification address (e.g., the ICAO address) of the aircraft from transmissions of a transponder of the aircraft (e.g., a Mode S transponder). As illustrated, the ADS-B system 110 may employ passive reception to acquire information broadcast from the transponder 104 of the aircraft in which the ADS-B system 110 is installed. However, it is contemplated that active interrogation techniques may also be used. Where passive reception of transponder reply transmissions is employed, the transponder 104 detects interrogations transmitted by an interrogation source (Block 302). For example, in embodiments, the transponder 104 may detect interrogations transmitted at a frequency of 1030 MHz by ATC ground stations or other active traffic detection equipped aircraft (e.g., the ATC ground station 106 or aircraft 108 of FIG. 1). The transponder 104 transmits reply transmissions in response to the interrogations (Block 304). For example, the transponder 104 may transmit a 1090 MHz Mode S reply transmission as described above in the discussion of FIG. 1. In some embodiments, the aircraft transponder 104 may employ Extended Squitter Data 305 which is periodically transmitted in a random time slot without any interrogation source.

The ADS-B system 110 monitors the reply transmissions transmitted by the transponder 104 (Block 306). When a reply transmission transmitted by the transponder 104 is detected ("YES" at Decision Block 308), the reply transmission may be received by the ADS-B system 110 (Block 310) using a receiver associated with the system 110 (e.g., a receiver of receiver assembly 112 shown in FIGS. 1 and 2). Otherwise, the ADS-B system 110 may continue to monitor for receipt of reply transmissions ("NO" at Decision Block 308).

The identification address of the aircraft is extracted from the received reply transmission broadcast by transponder 104 (Block 312). For example, in embodiments where the transponder 104 is configured to transmit Mode S reply transmissions, the ADS-B system 110 may extract the ICAO address for the aircraft from the Mode S transmission. The ADS-B system 110 may further extract other information including, but not necessarily limited to: altitude information (e.g., "pressure altitude"), an indication that the aircraft is capable of receiving ADS-B In information (e.g., a 978 RX capable bit), and so forth. This information may be stored to memory 208 of the ADS-B receiver 202 for use by the ADS-B system 110.

As noted, the ADS-B system 110 may employ passive reception of transponder transmissions. In such embodiments, the receiver assembly 112 is configured to receive transmissions of the transponder 104 that are transmitted periodically or in response to interrogation of the transponder 104 by an interrogation source external to the aircraft 102 (e.g., an ATC ground station 106, another aircraft 108, and so forth). However, it is contemplated that, in some embodiments, the ADS-B system 110 may also employ active wireless interrogation of the transponder to cause the transponder to broadcast reply transmissions. In such embodiments, the ADS-B system 110 may transmit interrogations to the transponder 104 to cause the transponder 104 to transmit a reply transmission (Block 316). For example, as noted in the discussions of FIGS. 1 and 2, the ADS-B system 110 may further include a transmitter assembly 114 configured to transmit interrogations to the transponder 104 to cause the transponder 104 to transmit a reply transmission that may be received by the receiver assembly 112. The ADS-B system 110 monitors the transmissions transmitted by the transponder 104 of aircraft 102 (Block 306). When data is transmitted by the transponder 104 ("YES" at Decision Block 308), it is received by the ADS-B system 110 (Block 310) using a receiver associated with the system 110 (e.g., receiver assembly 112 of FIG. 1 and FIG. 2). The identification address of the aircraft is then extracted from the received reply transmission (Block 312) along with any other data (Block 314) which the ADS-B system needs to automatically synchronize with as described above.

FIG. 3B depicts a procedure 300 in an example embodiment in which the ADS-B system 110 determines whether the aircraft is included in the air traffic information (e.g., TIS-B air traffic information) broadcast by an ATC ground station. As illustrated, the ADS-B system 110 monitors ATC ground stations 106 for transmissions (Block 314) broadcast by the ground stations 106 that include air traffic information and a client list, which includes identification addresses of aircraft included in the air traffic information. For example, in embodiments, the receiver assembly may comprise a 1090 MHz receiver and/or a 978 MHz receiver configured to receive TIS-B transmissions from ATC ground stations 106. The TIS-B transmissions comprise TIS-B air traffic information and a TIS-B service status list including the ICAO addresses of aircraft included in the TIS-B air traffic information.

When a transmission is received from an ATC ground station 106 (Block 316), the client list is extracted from the transmission (Block 318). The identification address of the aircraft 102 is then used to determine whether the aircraft 102 is included in the received air traffic information by comparing the identification address of aircraft 102 with the identification addresses in the client list. For example, the TIS-B service status list may be extracted from a TIS-B transmission received from an ATC ground station 106. The ICAO address of the aircraft 102 is then used to determine whether the aircraft 102 is included in TIS-B air traffic coverage by comparing the ICAO address of the aircraft 102 with the ICAO addresses in the TIS-B service status list. Thus, as shown in FIG. 3B, the ADS-B system 110 may make a determination whether the aircraft identification address (e.g., the ICAO address) is contained in the client list (e.g., is in the TIS-B service status list) (Decision Block 320).

When a determination is made that the aircraft identification address (e.g., the ICAO address) of aircraft 102 employing the ADS-B system 110 is not included in the client list (e.g., in the TIS-B service status list) ("NO" at Decision Block 320), the ADS-B system 110 may furnish a notification that the aircraft 102 is not included in the air traffic information (e.g., that TIS-B air traffic coverage is not provided for the aircraft 102) (Block 322). For example, in embodiments, the ADS-B system 110 (e.g., a portable ADS-B-enabled device) may employ a deterministic status bit that is set when TIS-B coverage including the aircraft 102 is determined to be available. In this manner, the ADS-B system 110 may furnish (e.g., display via a display 220 of a portable electronic device 204 of the system 110) an indication to the flight crew (e.g., the pilot, a copilot, etc.) that TIS-B coverage including the aircraft 102 is available and/or that TIS-B coverage including the aircraft 102 is not available. Thus, when a determination is made that the aircraft identification address (e.g., the ICAO address) of aircraft 102 is not included in the client list (e.g., is not included in the TIS-B service status list), the deterministic bit is not set in the ADS-B system 110 so that a notification that TIS-B coverage including the aircraft 102 is not available is furnished (e.g., displayed or presented) by the ADS-B system 110. The ADS-B system 110 may then continue monitoring (TIS-B) transmissions from ATC ground stations 106 (Block 314). When a determination is made that the aircraft identification address (e.g., the ICAO address) of aircraft 102 employing the ADS-B system 110 is included in the client list (e.g., is in the TIS-B service status list) ("YES" at Decision Block 320), a notification is provided that the aircraft 102 is included in the air traffic information (e.g., that TIS-B air traffic coverage is provided for the aircraft 102) (Block 324). For example, the deterministic status bit may be set in the ADS-B system 110 so that a notification may be furnished by the ADS-B system 110 that TIS-B coverage including the aircraft 102 is available.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system configured for operation in an aircraft, the system comprising:
 a receiver assembly operable to receive a first transmission from a transponder associated with the aircraft, the first transmission including an identification address configured to identify the aircraft, and to receive a second transmission from an air traffic control ground station, the second transmission including air traffic information and a client list including identification addresses of aircraft included in the air traffic information; and
 a processing system operable to:
  retrieve the identification address associated with the first transmission; and
  determine whether the aircraft is included in the air traffic information by comparing the identification address of the aircraft with the identification addresses in the client list.

2. The system as recited in claim 1, further comprising a global navigation satellite system receiver operable to determine a position of the aircraft, wherein the processing system is operable to distinguish the first transmission from transmissions received from transponders of other aircraft based on the determined position of the aircraft.

3. The system as recited in claim 1, wherein the processing system is operable to distinguish the first transmission from transmissions from transponders of other aircraft by comparing a power level of the first transmission with power levels of transmission received from transponders of other aircraft.

4. The system as recited in claim 1, wherein the receiver assembly comprises a 1090 MHz receiver configured to receive a Mode S reply transmission.

5. The system as recited in claim 4, wherein the receiver assembly further comprises a 978 MHz receiver.

6. The system as recited in claim 4, wherein the processing system is further configured to determine whether the first transmission includes an indication that the aircraft is capable of receiving ADS-B information.

7. The system as recited in claim 1, wherein the transponder of the aircraft is further configured to transmit pressure altitude information for the aircraft, and wherein the receiver assembly is configured to receive the transmitted pressure altitude information for decoding by the processing system.

8. The system as recited in claim 1, wherein the first transmission comprises a Mode S transmission and the identification address comprises an ICAO address, and wherein the traffic information comprises TIS-B traffic information.

9. A method comprising:
receiving a Mode S transmission from a transponder of an aircraft, the Mode S transmission including an ICAO address configured to identify the aircraft;
retrieving the ICAO address from the Mode S transmission;
receiving a TIS-B transmission from the air traffic control ground station, the TIS-B transmission including TIS-B air traffic information and a TIS-B service status list including ICAO addresses of aircraft included in the TIS-B air traffic information;
determining whether the aircraft is included in the TIS-B air traffic information by comparing the ICAO address of the aircraft with the ICAO addresses of the TIS-B service status list; and
causing an indication of whether the aircraft is included in the air traffic information to be displayed by a portable electronic device.

10. The method as recited in claim 9, wherein the receiving of the Mode S transmission from the transponder associated with the aircraft comprises determining a position of the aircraft using a global navigation satellite system receiver and distinguishing the Mode S transmission from the transponder associated with the aircraft from Mode S transmissions received from transponders of other aircraft based on the determined position of the aircraft.

11. The method as recited in claim 10, wherein the receiving of the Mode S transmission from the transponder associated with the aircraft comprises distinguishing the Mode S transmission from the transponder associated with the aircraft from Mode S transmissions received from transponders of other aircraft by comparing a power level of the Mode S transmission of the transponder associated with the aircraft with power levels of the Mode S transmissions received from transponders of the other aircraft.

12. The method as recited in claim 11, further comprising determining whether the Mode S transmission from the transponder includes an indication that the aircraft is capable of receiving ADS-B information.

13. The method as recited in claim 11, further comprising receiving pressure altitude information for the aircraft transmitted by the transponder of the aircraft.

14. A portable ADS-B-enabled device configured for operation in an aircraft, the portable ADS-B-enabled device comprising:
a receiver assembly operable to receive a Mode S transmission from a transponder of the aircraft, the Mode S transmission including an ICAO address configured to identify the aircraft, and to receive a TIS-B transmission from the air traffic control ground station, the TIS-B transmission including TIS-B air traffic information and a TIS-B service status list including ICAO addresses of aircraft included in the TIS-B air traffic information; and
a processing system operable to:
retrieve the ICAO address of the aircraft from the Mode S transmission; and
determine whether the aircraft is included in the TIS-B air traffic information by comparing the ICAO address of the aircraft with the ICAO addresses in the TIS-B service status list.

15. The portable ADS-B-enabled device as recited in claim 14, further comprising a global navigation satellite system receiver operable to determine a position of the aircraft, wherein the processing system is operable to distinguish the Mode S transmission from the transponder associated with the aircraft from Mode S transmissions received from transponders of other aircraft based on the determined position of the aircraft.

16. The portable ADS-B-enabled device as recited in claim 14, wherein the processing system is operable to distinguish the Mode S transmission from the transponder associated with the aircraft from Mode S transmissions from transponders of other aircraft by comparing a power level of the Mode S transmission of the transponder associated with the aircraft with power levels of the Mode S transponders of the other aircraft.

17. The portable ADS-B-enabled device as recited in claim 14, wherein the receiver assembly comprises a 1090 MHz receiver configured to receive a Mode S reply transmission.

18. The portable ADS-B-enabled device as recited in claim 17, wherein the receiver assembly further comprises a 978 MHz receiver.

19. The portable ADS-B-enabled device as recited in claim 14, further comprising a communication module configured for communication with a portable electronic device, the processing system further configured to cause an indication of whether the aircraft is included in the air traffic information to be displayed by a display of the portable electronic device.

20. The portable ADS-B-enabled device as recited in claim 19, wherein the portable electronic device is integrated with at least one of the communication module, the receiver assembly, and the processing system.

* * * * *